United States Patent
Fahn et al.

(10) Patent No.: US 9,218,545 B2
(45) Date of Patent: Dec. 22, 2015

(54) METHOD AND SYSTEM FOR HUMAN ACTION RECOGNITION

(71) Applicant: National Taiwan University of Science and Technology, Taipei (TW)

(72) Inventors: Chin-Shyurng Fahn, Taipei (TW); Chang-Yi Kao, Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 30 days.

(21) Appl. No.: 14/151,823

(22) Filed: Jan. 10, 2014

(65) Prior Publication Data

US 2015/0023590 A1 Jan. 22, 2015

(30) Foreign Application Priority Data

Jul. 16, 2013 (TW) .............................. 102125441 A

(51) Int. Cl.
G06K 9/62 (2006.01)
G06K 9/00 (2006.01)

(52) U.S. Cl.
CPC .......... *G06K 9/6256* (2013.01); *G06K 9/00335* (2013.01)

(58) Field of Classification Search
None
See application file for complete search history.

(56) References Cited

U.S. PATENT DOCUMENTS

| | | | | |
|---|---|---|---|---|
| 2003/0095140 | A1* | 5/2003 | Keaton et al. | 345/700 |
| 2007/0250461 | A1* | 10/2007 | Sabe et al. | 706/12 |
| 2010/0027892 | A1* | 2/2010 | Guan et al. | 382/203 |
| 2010/0315506 | A1* | 12/2010 | Liu et al. | 348/143 |
| 2011/0044501 | A1* | 2/2011 | Tu et al. | 382/103 |
| 2011/0066984 | A1* | 3/2011 | Li | 715/863 |
| 2011/0235926 | A1* | 9/2011 | Yokono | 382/225 |
| 2011/0255748 | A1* | 10/2011 | Komoto et al. | 382/103 |

(Continued)

FOREIGN PATENT DOCUMENTS

| | | |
|---|---|---|
| TW | 201101197 | 1/2011 |
| TW | 201123031 | 7/2011 |

(Continued)

OTHER PUBLICATIONS

Alon, Jonathan, et al. "A unified framework for gesture recognition and spatiotemporal gesture segmentation." Pattern Analysis and Machine Intelligence, IEEE Transactions on 31.9 (2009): 1685-1699.*

(Continued)

*Primary Examiner* — Stephen R Koziol
*Assistant Examiner* — Sean Conner
(74) *Attorney, Agent, or Firm* — Jianq Chyun IP Office

(57) ABSTRACT

A method and a system for human action recognition are provided. In the method, a plurality of training data corresponding to a plurality of gestures are received and clustered into at least one group according to similarity between the training data, where the training data represent the gestures, and a corresponding relationship between the training data and the gestures may be one-to-one or many-to-one. An image sequence of human action is captured, and a data representing the human action to be identified is obtained there from. Then, a specific group having the highest similarity with the data to be identified is selected from the groups, and a ranking result of all the training data within the specific group is obtained through a rank classifier and the data to be identified. Finally, the human action is identified as the gesture represented by the first training data in the ranking result.

11 Claims, 4 Drawing Sheets

(56) References Cited

U.S. PATENT DOCUMENTS

| | | | | |
|---|---|---|---|---|
| 2012/0001875 | A1* | 1/2012 | Li et al. | 345/177 |
| 2012/0214594 | A1* | 8/2012 | Kirovski et al. | 463/36 |
| 2012/0323521 | A1* | 12/2012 | De Foras et al. | 702/141 |
| 2013/0069867 | A1* | 3/2013 | Watanabe | 345/156 |
| 2013/0142417 | A1* | 6/2013 | Kutliroff et al. | 382/159 |
| 2013/0208978 | A1* | 8/2013 | Ribnick et al. | 382/159 |
| 2013/0294651 | A1* | 11/2013 | Zhou et al. | 382/103 |
| 2013/0335318 | A1* | 12/2013 | Nagel et al. | 345/156 |
| 2014/0010441 | A1* | 1/2014 | Shamaie | 382/164 |
| 2014/0029789 | A1* | 1/2014 | DeLean et al. | 382/103 |
| 2014/0198954 | A1* | 7/2014 | Bulzacki | 382/103 |
| 2014/0204013 | A1* | 7/2014 | O'Prey et al. | 345/156 |
| 2014/0347263 | A1* | 11/2014 | Dai et al. | 345/156 |

FOREIGN PATENT DOCUMENTS

| | | |
|---|---|---|
| TW | 201234284 | 8/2012 |
| TW | 201241759 | 10/2012 |
| WO | 2011159258 | 12/2011 |

OTHER PUBLICATIONS

Cao, Zhe, et al. "Learning to rank: from pairwise approach to listwise approach." Proceedings of the 24th international conference on Machine learning. ACM, 2007.*

Cao, Xianbin, et al. "Selecting key poses on manifold for pairwise action recognition." Industrial Informatics, IEEE Transactions on 8.1 (2012): 168-177.*

Elmezain, Mahmoud, Ayoub Al-Hamadi, and Bernd Michaelis. "Real-time capable system for hand gesture recognition using hidden markov models in stereo color image sequences." (2008).*

Fahn, Chin-Shyurng, Chih-Wei Huang, and Hung-Kuang Chen. "A real-time gesture tracking and recognition system based on particle filtering and Ada-Boosting techniques." Universal Access in Human-Computer Interaction. Ambient Interaction. Springer Berlin Heidelberg, 2007. 818-827.*

Fahn, Chin-Shyurng, and Keng-Yu Chu. "Hidden-Markov-model-based hand gesture recognition techniques used for a human-robot interaction system." Human-Computer Interaction. Interaction Techniques and Environments. Springer Berlin Heidelberg, 2011. 248-258.*

Fahn, Chin-Shyurng, and Sheng-Lung Chiang. "Real-Time Upper-Limbs Posture Recognition Based on Particle Filters and AdaBoost Algorithms." ICPR. 2010.*

Freund, Yoav, et al. "An efficient boosting algorithm for combining preferences." The Journal of machine learning research 4 (2003): 933-969.*

Kao, Chang-Yi, and Chin-Shyurng Fahn. "A human-machine interaction technique: hand gesture recognition based on hidden Markov models with trajectory of hand motion." Procedia Engineering 15 (2011): 3739-3743.*

Mitra, Sushmita, and Tinku Acharya. "Gesture recognition: A survey." Systems, Man, and Cybernetics, Part C: Applications and Reviews, IEEE Transactions on 37.3 (2007): 311-324.*

Raptis, Michalis, Darko Kirovski, and Hugues Hoppe. "Real-time classification of dance gestures from skeleton animation." Proceedings of the 2011 ACM SIGGRAPH/Eurographics symposium on computer animation. ACM, 2011.*

Tsai, Ming-Feng, et al. "FRank: a ranking method with fidelity loss." Proceedings of the 30th annual international ACM SIGIR conference on Research and development in information retrieval. ACM, 2007.*

Yang, Peng, Qingshan Liu, and Dimitris N. Metaxas. "Rankboost with l1 regularization for facial expression recognition and intensity estimation." Computer Vision, 2009 IEEE 12th International Conference on. Ieee, 2009.*

Yilmaz, Emine, Javed A. Aslam, and Stephen Robertson. "A new rank correlation coefficient for information retrieval." Proceedings of the 31st annual international ACM SIGIR conference on Research and development in information retrieval. ACM, 2008.*

Kao et al., "A multi-stage learning framework for intelligent system," Expert Systems with Applications 40(9), Feb. 2013, pp. 3378-3388.

"Office Action of Taiwan Counterpart Application", issued on Mar. 23, 2015, p. 1-p. 5.

* cited by examiner

METHOD AND SYSTEM FOR HUMAN ACTION RECOGNITION

CROSS-REFERENCE TO RELATED APPLICATION

This application claims the priority benefit of Taiwan application serial no. 102125441, filed on Jul. 16, 2013. The entirety of the above-mentioned patent application is hereby incorporated by reference herein and made a part of this specification.

BACKGROUND OF THE INVENTION

1. Field of the Invention

The invention relates to a method for human action recognition, and more particularly, to a method and a system for human action recognition based on a method of learning to rank.

2. Description of Related Art

Human machine interface refers to a medium for communication between an electronic product or a system and a user, in which the user can give instructions through the human machine interface to control the electronic product or the system to execute a specific function. The traditional human machine interface relies on a hardware device, such as a mouse, a keyboard, a remote control, or a joystick, and so on, to receive instructions from the user. However, with a rise of somatosensory control applications, the human machine interface that allows the user to perform input by a gesture becomes more popular and also more important.

Currently, most of products or techniques related to supporting gesture identification need to be combined with the support of devices such as an infrared sensor to effectively identify gesture types, and models used to identify the gestures need to be defined in the system in advance. If the system were to identify gestures of numbers or English alphabets drawn by actions of a forelimb of the user in the air, models of the numbers 0 to 9 or upper case and lower case English alphabets for gesture identification need to be defined in advance. It is not hard to predict that since the models of gesture identification and the method of calculation need to be defined in the system in advance, the flexibility of the system is lower and the complexity thereof is higher. Moreover, for users with different writing habits, the correct identification result may not be effectively obtained.

SUMMARY OF THE INVENTION

The invention provides a method and a system for human action recognition. The method and the system for human action recognition can automatically identify a gesture represented by human action through learning. Moreover, the method and the system for human action recognition can flexibly increase or decrease the human action to be identified.

The method for human action recognition of the invention includes receiving a plurality of training data and clustering the training data into at least one group according to the similarity between the training data, wherein the training data correspond to a plurality of gestures, and a corresponding relationship between the training data and the gestures may be one-to-one, or many-to-one. Next, an image sequence of human action is captured, and a data representing the human action to be identified is obtained from the image sequence. After that, a specific group having the highest similarity with the data to be identified is selected from the groups, and a ranking result of all the training data within the specific group is obtained through a rank classifier and the data to be identified. Finally, the human action is identified as the gesture represented by the first training data in the ranking result.

In an embodiment of the invention, the gesture represented by each of the training data corresponds to a control instruction of an electronic system, and the method for human action recognition further includes, after the step of identifying the human action as the gesture represented by the first training data: transmitting the control instruction corresponding to the gesture represented by the first training data to the electronic system such that the electronic system executes a function.

In an embodiment of the invention, the step of clustering the training data into at least one group according to the similarity between the training data includes: clustering the training data into the at least one group through possible clustering techniques such as a classifier method. The classifier method may comprise k-nearest neighbor algorithm (KNN) or hierarchical clustering.

In an embodiment of the invention, the method for human action recognition further includes: training the rank classifier through a method of learning to rank, wherein the rank classifier reflects the ranking relationship and the data distance, such as the method using concordant/discordant concept of each of the pair-wise data in all of the training data within the specific group.

In an embodiment of the invention, the step of training the rank classifier through the method of learning to rank includes: generating a weak classifier according to all of the training data within the specific group and each of the pair-wise data in the training data; obtaining the ranking relationship of each of the pair-wise data through the weak classifier, wherein the ranking relationship includes the pair-wise data is concordant in two ranking results of training or the pair-wise data is discordant in two ranking results of training; calculating the accuracy of the weak classifier according to the ranking relationship and the data distance of each of the pair-wise data; updating a weight value of each of the pair-wise data according to the accuracy and the ranking relationship and the data distance of each of the pair-wise data; and repeating each of the steps until a convergence condition is met, and generating the rank classifier through each of the generated weak classifier and the corresponding accuracy, wherein the convergence condition includes a total number of training rounds reaches a default value or the ranking relationship of the pair-wise data no longer changes.

In an embodiment of the invention, the human action is a forelimb action and the gesture is a dynamic number gesture or a dynamic English alphabet gesture.

The system for human action recognition of the invention includes a storage unit and a processing unit coupled to each other, wherein the storage unit records a plurality of instructions and the processing unit accesses and executes the instructions recorded in the storage unit to execute the following steps: receive a plurality of training data and cluster the training data into at least one group according to the similarity between the training data, wherein the training data correspond to a plurality of gestures, and a corresponding relationship between the training data and the gestures may be one-to-one, or many-to-one. Next, an image sequence of human action is captured, and a data representing the human action to be identified is obtained from the image sequence. After that, a specific group having the highest similarity with the data to be identified is selected from the groups, and a ranking result of all the training data within the specific group is obtained through a rank classifier and the data to be identified. Finally, the human action is identified as the gesture represented by the first training data in the ranking result.

Based on the above, the method and the system for human action recognition of the invention do not require defining identification rules of various gestures in advance. That is, gesture models do not need to be defined in advance, but instead the method and the system for human action recognition automatically identify gestures represented by human action through a method of learning to rank. In this way, not only can human action be effectively identified, the flexibility of the identification system can also be increased.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The method and the system for human action recognition provided by the invention may identify human action in space through a method of learning to rank. For instance, the gesture of English alphabets and/or numbers drawn by a human forelimb in space can be identified, and the identification result can be applied in various application environments requiring input of the English alphabets or numbers.

Figure 1A:
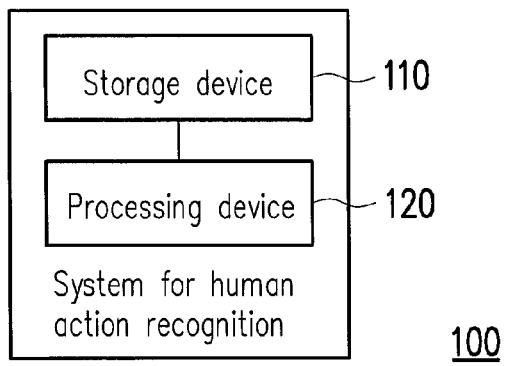
FIG. 1A is a block diagram of a system for human action recognition illustrated according to an embodiment of the invention.

FIG. 1A is a block diagram of a device for human action recognition illustrated according to an embodiment of the invention. Referring to FIG. 1A, a device 100 for human action recognition includes a storage device 110 and a processing device 120 coupled to each other, and the function of each is illustrated as follows.

The storage device 110 can be a volatile memory device or a nonvolatile memory device, for instance, a random access memory (RAM), a read-only memory (ROM), a flash memory, a hard drive, or other similar devices or a combination of the aforesaid devices. The storage device 110 is used to record a plurality of instructions that can be executed by the processing device 120, and the instructions can achieve the function of human action recognition after the instructions are executed by the processing device 120.

The processing device 120 is, for instance, a central processing unit (CPU) or other programmable microprocessors for conventional use or special use, a digital signal processor (DSP), a programmable controller, an application specific integrated circuit (ASIC), a programmable logic device (PLD), or other similar systems or a combination of the systems. The processing device 120 can access and execute the instructions recorded in the storage device 110 such that the device 100 for human action recognition can identify the meaning of human action in space, such as identifying a dynamic gesture represented by a forelimb action. The dynamic gesture can be a dynamic number gesture, a dynamic English alphabet gesture, or any gesture defined by the user, that is, the device 100 for human action recognition can be extended to recognize any other symbols for identifying the meaning of human action in space, not limited thereto.

Figure 1B:
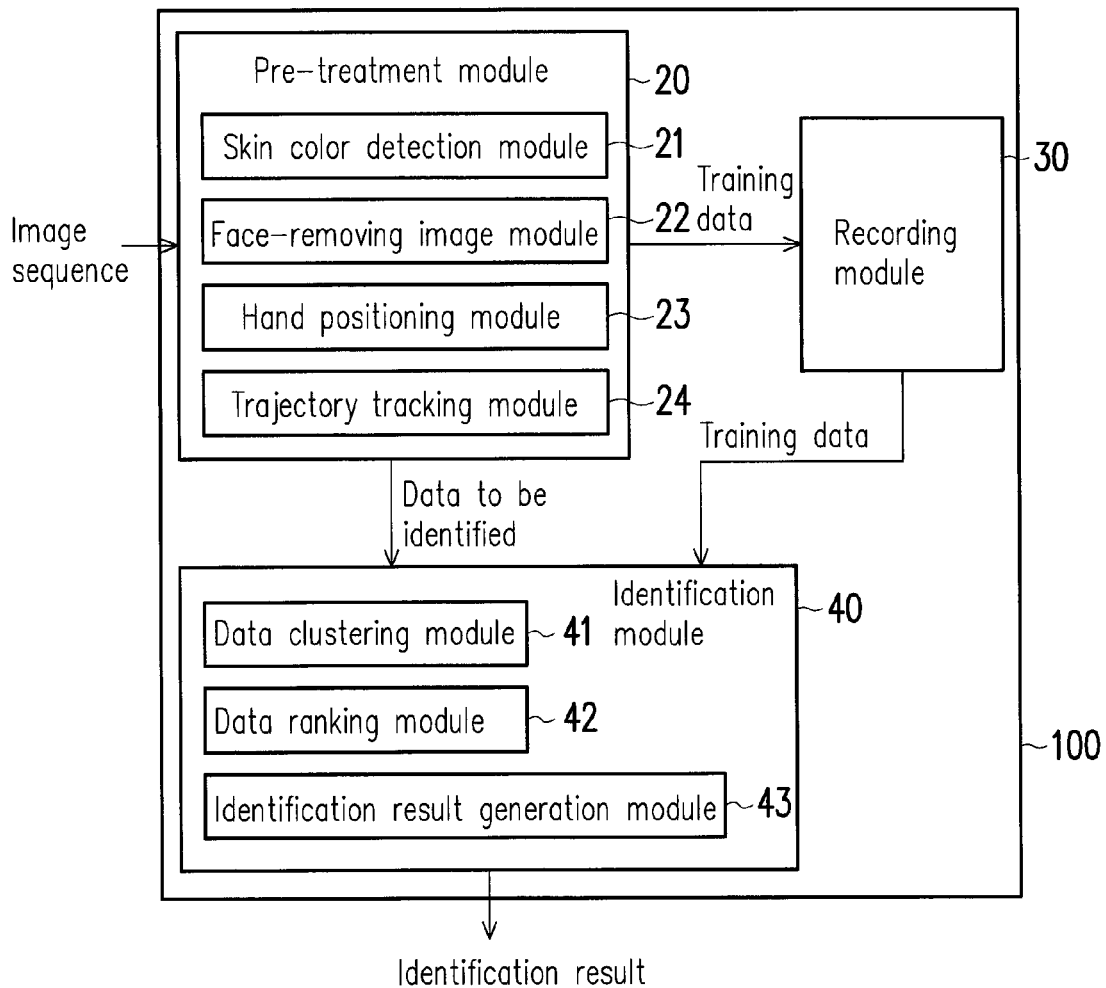
FIG. 1B is a schematic diagram of the operation of a system for human action recognition illustrated according to an embodiment of the invention.

FIG. 1B is a schematic diagram of the operation of a system for human action recognition illustrated according to an embodiment of the invention. Referring to FIG. 1B, whenever the device 100 for human action recognition obtains an image sequence with a plurality of images in response to the action of the user, a pre-treatment module 20 first performs a pre-treatment on the image sequence. The pre-treatment module 20 includes: a skin color detection module 21, a face-removing image module 22, a hand positioning module 23, and a trajectory tracking module 21. The skin color detection module 21 is used to detect the skin color region in the image. The skin color detection module 21 can first perform a conversion of color space on the image (such as converting the image from a RGB color space to a hue-saturation-value (HSV) color space), and then use a color distinguish threshold value to detect a skin color region. For instance, the skin color detection module 21 determines a region having a saturation value between 0.1 and 0.9 and a hue value between 2 and 39 as a skin color region; however, the invention is not limited thereto, some other methods may be used for the determination. Since the skin color region can be a facial region or a limb region such as a hand, if the device 100 for human action recognition is to identify the action of a limb such as a hand, the skin color region may be further confirmed by the face-removing image module 22 to determine whether the skin color region is the skin color region of the face through a method of eye detection, and the skin color region may be removed if the skin color region belongs to the face. The hand positioning module 23 may be used to further confirm the skin color regions outside of the facial region. In general, in an image, the size of the hand region is about a quarter of that of the facial region, and the hand positioning module 23 confirms the skin color region of the hand based on the ratio and a default error value, and also confirms if the person in the image is in a state of giving instructions according to whether or not the position of the skin color region of the hand is in front of the user's chest. After the position of the hand is confirmed, the trajectory tracking module 24 can continuously track a trajectory formed by the gesture at the start of action until the action stops, and divide the trajectory into a plurality of small segments to obtain feature vectors of the segments to be used as the data corresponding to the image sequence.

In the following, data generated by performing a pre-treatment on the image sequence in a training stage through by the pre-treatment module 20 is referred to as "training data", and data generated by performing a pre-treatment on the image sequence in an identification stage through the pre-treatment module 20 is referred to as "data to be identified". All of the training data are transmitted to the recording module 30 for the subsequent identification stage. The data to be identified is transmitted to the identification module 40 and the identification module 40 identifies the data to be identified according to a plurality of training data recorded by the recording module 30. In the present embodiment, the identification module 40 includes a data clustering module 41, a data ranking module 42, and an identification result generating module 43. The data clustering module 41 is used to divide all of the training data into one or a plurality of groups. The data ranking module 42 obtains a specific group from all of the groups and ranks the training data in the specific group. The identification result generating module 43 generates and outputs the identification result according to the first training data in the ranking result.

The device 100 for human action identification can be integrated into the application of any electronic system capable of receiving gesture operation, and gesture types represented by the human action can be detected and identified through the device 100 for human action recognition, and thereby the electronic system is controlled to execute the corresponding function. For instance, the electronic system can be a smart TV, a TV top box, a robot, a smart elevator, a remote education system based on e-learning, but the invention is not limited thereto.

Figure 2:
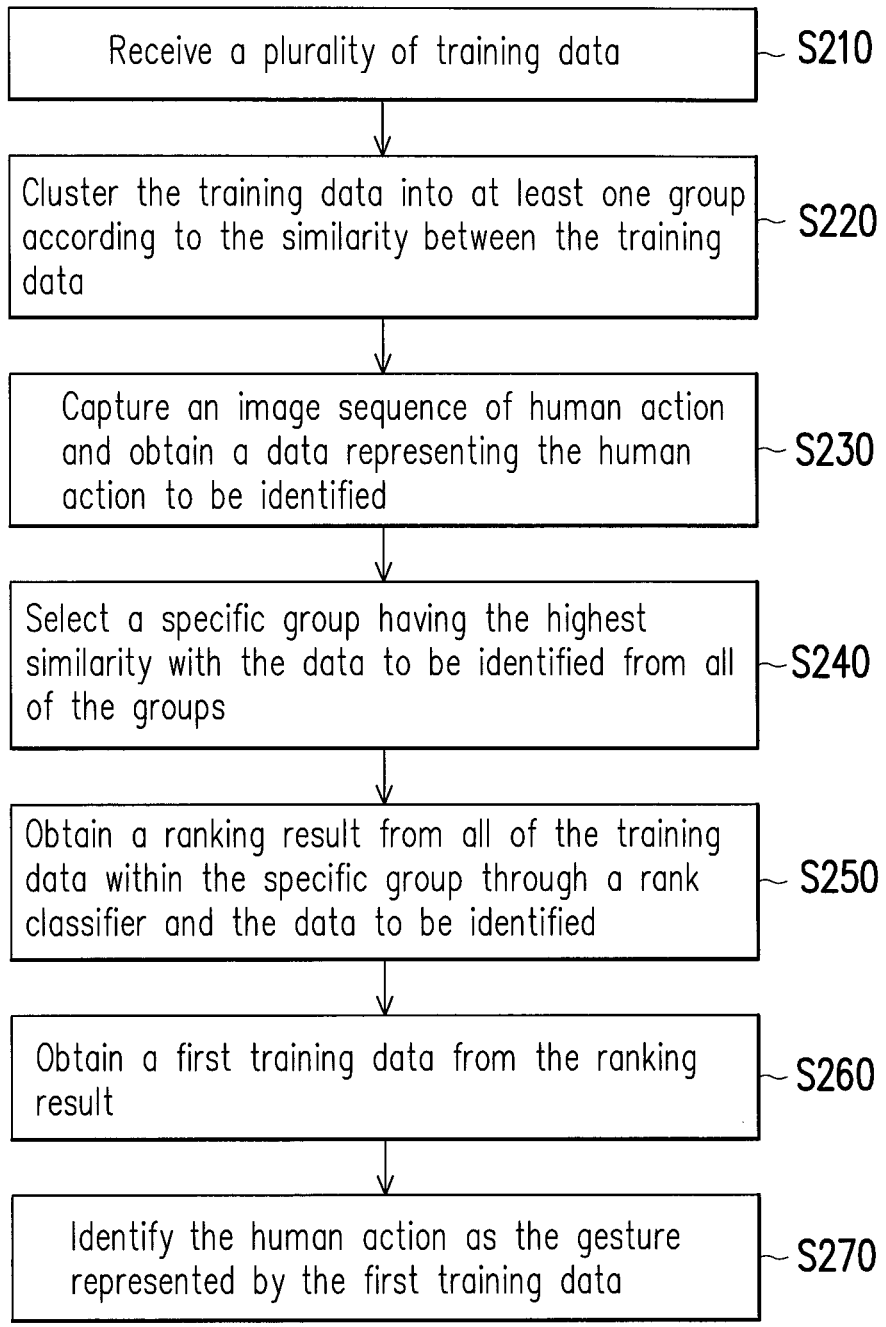
FIG. 2 is a flowchart of a method for human action recognition illustrated according to an embodiment of the invention.

FIG. 2 is a flowchart of a method for human action recognition illustrated according to an embodiment of the invention. Referring to both FIG. 1A and FIG. 2, the method of the present embodiment is suitable for a recognition device such as the device 100 for human action recognition shown in FIG. 1A. In the following, the detailed steps of the method for human action recognition of the present embodiment are explained with the device 100 for human action recognition. In short, the method for human action recognition of the present embodiment includes a training stage and an identification stage. The training stage trains various gestures to be identified by the device 100 for human action recognition, and the identification stage identifies which gesture a human action belongs to when receiving the human action.

Figure 3A:
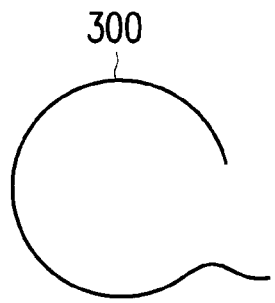
FIG. 3A is a schematic diagram of a dynamic gesture trajectory illustrated according to an embodiment of the invention.
Figure 3B:
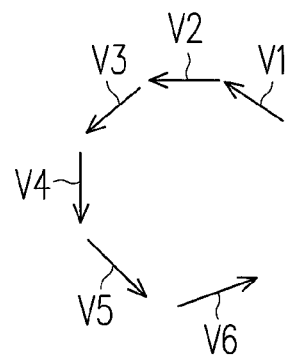
FIG. 3B is a schematic diagram of feature vector of a dynamic gesture trajectory illustrated according to an embodiment of the invention.

First, as shown by step S210, the device 100 for human action recognition receives a plurality of training data, in which each of the training data represents a gesture. Furthermore, if the device 100 for human action recognition is used to identify the number (0, 1 to 9) or English alphabet (upper case A to Z, lower case a to z) the user drew by waving his forelimb in the air, then each of the training data is the feature vector obtained from the dynamic number gestures or the dynamic English alphabet gestures. Using the upper case English alphabet "C" as an example, the device 100 for human action recognition captures a plurality of images from a dynamic gesture of the "C" written by the user with his forelimb in the air and saves these captured images as an image sequence, performs pre-treatment processes on the image sequence such as skin color detection, facial image removal, hand positioning, and trajectory tracking to obtain a trajectory of the dynamic gesture (such as the trajectory 300 of FIG. 3A), then divides the trajectory of the dynamic gesture into a plurality of segments (such as 6 segments, but not limited thereto), and then obtains the corresponding feature vector for each of the trajectory segments (such as the 6 feature vector V1 to V6 shown in FIG. 3B). The feature vector corresponding to all of the trajectory segments are the training data of the dynamic gesture. In an embodiment, to increase identification rate, the device 100 for human action recognition can, for each of the gestures to be identified by the device 100 for human action recognition, receive the training data repeatedly generated by the same user or the training data generated by a plurality of users.

After one or a plurality of training data is obtained for various gestures that can be identified, as shown in step S220, the device 100 for human action recognition clusters all of the training data into at least one group according to the similarity between the training data. For instance, the device 100 for human action recognition clusters all of the training data to obtain at least one group through possible clustering techniques such as a classifier method, which may comprise k-nearest neighbor algorithm (KNN) or hierarchical clustering. It should be mention that, training data belonging to the same group are similar to each other but do not necessarily correspond to the same gesture. For instance, when a specific group separated by the device 100 for human action recognition includes 5 training data, 4 of the training data correspond to the same gesture and the last training data corresponds to another gesture.

In step S230, if the device 100 for human action recognition captures an image sequence of human action (such as forelimb action), then the device 100 for human action recognition enters the identification stage to identify the human action. At this point, the device 100 for human action recognition obtains a data representing the human action to be identified from the image sequence. In detail, the system 100 for human action recognition performs pre-treatment processes on the image sequence for such as skin color detection, facial image removal, hand positioning, and trajectory tracking to obtain the trajectory of the human action, and divides the trajectory of the dynamic gesture into a plurality of segments (such as 6 segments, but not limited thereto), and then obtains the corresponding feature vector for each of the trajectory segments. The feature vectors corresponding to all of the trajectory segments represent the data of the human action to be identified.

Then, as shown in step S240, the device 100 for human action recognition selects a specific group having the highest or higher similarity with the data to be identified from all of the groups separated in advance. The device 100 for human action recognition can find the group most similar to the data to be identified and use the group most similar to the data to be identified as the specific group by calculating the distance between the centroids of the data to be identified and each of the groups.

In step S250, the device 100 for human action recognition obtains a ranking result of all the training data within the specific group through a rank classifier and the data to be identified. The rank classifier of the present embodiment is obtained through the method of learning to rank, and the rank classifier reflects the ranking relationship and the data distance of each of the pair-wise data in all of the training data within the specific group, wherein the training method of the rank classifier and the definition of each of the ranking relationship and the data distance of the pair-wise data are explained later.

Then, in step S260, the device 100 for human action recognition obtains the first training data from the ranking result, and as shown in step S270, the device 100 for human action recognition identifies the human action as the gesture represented by the first training data.

Figure 4:
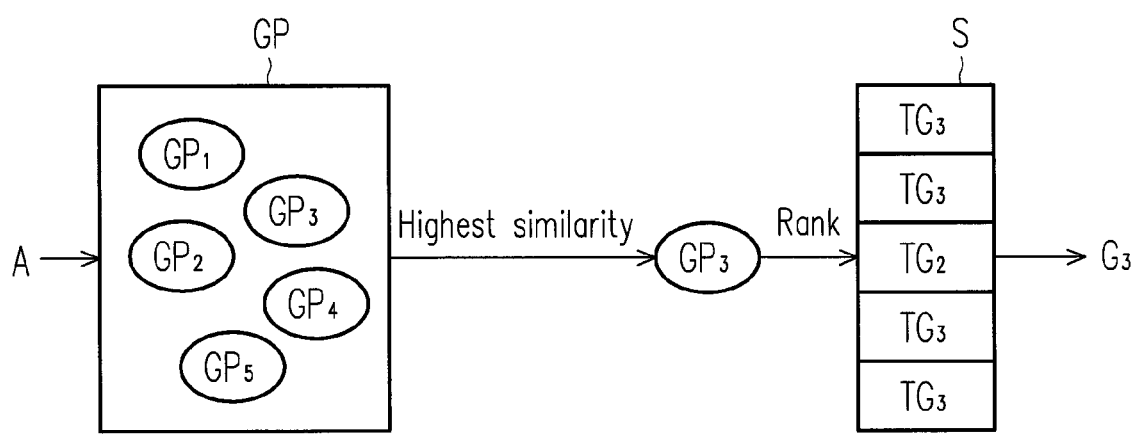
FIG. 4 is an example of a method for human action recognition illustrated according to an embodiment of the invention.

FIG. 4 is an example of a method for human action recognition illustrated according to an embodiment of the invention. As shown in FIG. 4, the device 100 for human action recognition, after obtaining a data representing a human action A to be identified, first finds a specific group $GP_3$ closest to the data to be identified from all of the groups $GP_1$ to $GP_5$ within a group set GP. In the present embodiment, the specific group $GP_3$ includes four training data $TG_3$ representing a same gesture $G_3$ and a training data $TG_2$ representing a gesture $G_2$. Then, based on the method of learning to rank, all of the training data in the specific group $GP_3$ is ranked to obtain a ranking result S. In the ranking result S, the gesture $G_3$ represented by the first training data $TG_3$ is the identification result to be outputted.

In the present embodiment, since the gestures represented by each of the training data correspond to the a control instruction of an electronic system, after identifying the human action as the gesture represented by the first training data, the device 100 for human action recognition transmits the control instruction corresponding to the gesture represented by the first training data to the electronic system such that the electronic system executes the corresponding function.

For instance, if the device 100 for human action recognition is integrated into the application of a smart TV, then the user can directly draw the channel number to be watched in the air with his hand, and the device 100 for human action recognition obtains the identification result, and then the smart TV is controlled to change to the corresponding channel. As a result, the function of choosing a channel with the traditional remote control can be replaced. If the device 100 for human action recognition is integrated into the application of a smart elevator, then the user can draw the desired floor in the air, and after the device 100 for human action recognition obtains the identification result, the smart elevator is controlled to move to the floor. As a result, the user does not need to directly touch the elevator button, which is very practical in the case of, for instance, a hospital elevator. If the device 100 for human action recognition is integrated into a remote education system based on e-learning, then traditional systems such as the mouse and the keyboard can be replaced, and the gesture inputted by the user can be directly identified such that the learning effect is more realistic. Furthermore, the device 100 for human action recognition can be applied in any product that is highly involved with numbers or English alphabets and needs a human machine interface with high usability.

In the above embodiment, the device 100 for human action recognition regards the data to be identified as a query, and after preliminarily selecting a more similar specific group, ranks all of the training data in the specific group by using the rank classifier trained by the method of learning to rank, and thereby obtains the gesture type represented by the human action represented by the data to be identified. In the following, detailed steps of training the rank classifier through the method of learning to rank is explained with FIG. 5. In short, the present embodiment generates a plurality of weak classifiers for a group of training data using a plurality of training rounds, and combines the weak classifiers to generate the rank classifier. In each round of training, the weight value is set according to the ranking relationship and the data distance of any two pair-wise data in all of the training data. As a result, the accuracy of the rank classifier can be increased.

Figure 5:
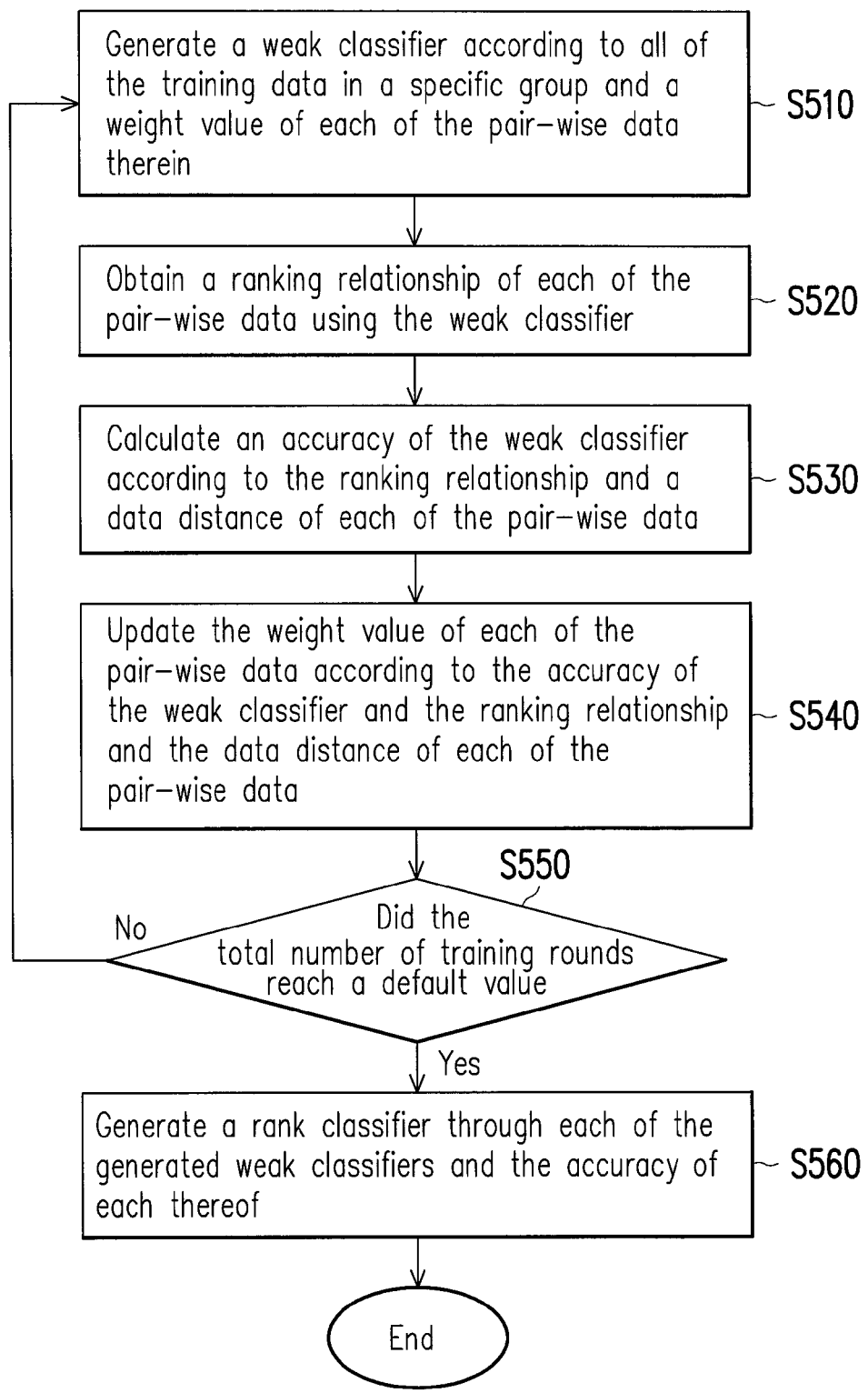
FIG. 5 is a flowchart of training a rank classifier through a method of learning to rank illustrated according to an embodiment of the invention.

Referring to FIG. 5, first, as shown in step S510, weak classifiers are generated according to all of training data within a specific group and a weight value of each of pair-wise data in all of the training data. For instance, if the specific group includes an m number of training data (represented as $x_1, x_2, \ldots, x_m$), then a pair-wise data refers to any two training data in the m number of training data (such as $(x_1, x_2), (x_1, x_3), \ldots, (x_2, x_3), \ldots, x_{m-1}, x_m)$), in which the weight value of each of the pair-wise data in the first training round is the reciprocal of the total number of pair-wise data in the m number of training data.

Then, in step S520, the ranking relationship of each of the pair-wise data is obtained through the weak classifiers generated by step S510. Specifically, the step ranks all of the training data within the specific group through the weak classifiers to obtain the ranking relationship of each of the pair-wise data, where the ranking relationship of a pair-wise data includes the pair-wise data is concordant in two ranking results of training or the pair-wise data is discordant in two ranking results of training. Using the pair-wise data $(x_1, x_2)$ as an example, if the training data $x_1$ ranks ahead of the training data $x_2$ in both the first ranking result of training and the second ranking result of training, then the ranking relationship of the pair-wise data $(x_1, x_2)$ is concordant. If the training data $x_1$ ranks behind the training data $x_2$ in both the first ranking result of training and the second ranking result of training, then the ranking relationship of the pair-wise data $(x_1, x_2)$ is also concordant. However, if the training data $x_1$ ranks ahead of the training data $x_2$ in the first ranking result of training and the training data $x_1$ ranks behind the training data $x_2$ in the second ranking result of training, then the ranking relationship of the pair-wise data $(x_1, x_2)$ is discordant. Moreover, if the training data $x_1$ ranks behind the training data $x_2$ in the first ranking result of training and the training data $x_1$ ranks ahead of the training data $x_2$ in the second ranking result of training, then the ranking relationship of the pair-wise data $(x_1, x_2)$ is also discordant, wherein the first and second ranking results of training are the results obtained by ranking the training data using the weak classifiers generated by two training rounds before and after.

In step S530, the accuracy of the weak classifiers generated by the training rounds is calculated according to the ranking relationship and the data distance of each of the pair-wise data. In the present embodiment, the accuracy $\alpha_t$ of the weak classifiers is, for instance, calculated through the following formula (1):

$$\alpha_t = \frac{1}{2} \ln\left(\frac{W_+}{W_-}\right) \qquad (1)$$

where, the "t" refers to the tth training round. The "$W_+$" refers to the situation in which the ranking relationship of the pair-wise data $(x_i, x_j)$ is concordant, and is defined here as $$\sum_{i,j} D_t(x_i, x_j)(1 - dd_t(x_i, x_j)),$$

wherein i and j are integers between 1 and m. The "$W_-$" refers to the situation in which the ranking relationship of the pair-wise data $(x_i, x_j)$ is discordant, and is defined here as $$\sum_{i,j} D_t(x_i, x_j)(dd_t(x_i, x_j)).$$

The "$D_t(x_i, x_j)$" refers to the weight value of the tth training round of the pair-wise data $(x_i, x_j)$. The "$dd_t(x_i, x_j)$" refers to the data distance of the pair-wise data $(x_i, x_j)$ in the tth training round. In the present embodiment, the definition of $dd_t(x_i, x_j)$ is as shown in the following formula (2):

$$dd_t(x_i, x_j) = |d_t(x_i, x_j) - d^*(x_i, x_j)| \qquad (2)$$

where, The "$d_t(x_1, x_j)$" is defined as $h_t(x_i) - h_t(x_j)$, and "$d^*(x_i, x_j)$" is defined as $h^*(x_i) - h^*(x_j)$. The "$h_t(\ )$" is the weak classifier generated by the tth training round, the "$h_t(x_i)$" and "$h_t(x_j)$" are ranking values of the training data $x_i$ and $x_j$ in the ranking result of training after the weak classifier generated by the tth training round ranks the training data. The "$h^*(x_i)$" and "$h^*(x_j)$" are ranking functions of the training data $x_i$ and $x_j$ in the ideal ranking result. In the situation that the ranking relationship of the pair-wise data ($x_i$, $x_j$) is concordant, the product of $d_t(x_i,x_j)$ and $d^*(x_i,x_j)$ is greater than 0; and in the situation that the ranking relationship of the pair-wise data ($x_i$, $x_j$) is discordant, the product of $d_t(x_i,x_j)$ and $d^*(x_i,x_j)$ is less than 0.

Then, as shown in step S540, the weight value of each of the pair-wise data is updated according to the accuracy of the weak classifier generated by the training round and the ranking relationship and the data distance of each of the pair-wise data. That is, the step calculates the weight value of each of the pair-wise data in the (t+1)th training round. In the present embodiment, when the ranking relationship of the pair-wise data ($x_i$, $x_j$) is concordant, the weight value $D_{t+1}(x_1, x_j)$ of the pair-wise data in the (t+1)th training round is, for instance, calculated using the following formula (3):

$$D_{t+1}(x_i, x_j) = \frac{D_t(x_i, x_j)\exp(1 - \alpha_t(1 - dd_t(x_i, x_j)))}{Z_t} \quad (3)$$

When the ranking relationship of the pair-wise data ($x_i$, $x_j$) is discordant, the weight value $D_{t+1}(x_i, x_j)$ of the pair-wise data in the (t+1)th training round is, for instance, calculated using the following formula (4):

$$D_{t+1}(x_i, x_j) = \frac{D_t(x_i, x_j)\exp(\alpha_t(dd_t(x_i, x_j)))}{Z_t} \quad (4)$$

In formula (3) and formula (4), $Z_t$ is the normalization factor used in the tth training round.

In the present embodiment, the convergence condition of training the ranking classifier is that the total number of training rounds reaches a default value, and therefore, in step S550, whether the current number of training rounds reaches the default value is determined. If the determination result of step S550 is no, then step S510 to step S550 are repeated to enter the next training round and to generate the weak classifier again. If the determination result of step S550 is yes, then as shown in step S560, the rank classifier is generated through the weak classifier generated by each of the training rounds and the corresponding accuracy of each thereof. It should be mentioned that, in other embodiments, the convergence condition of training the rank classifier can also include determining whether the ranking relationship of each of the pair-wise data is no longer changing.

In the above embodiment, the rank classifier is, for instance, generated by the following formula (5):

$$H(x) = \sum_{t=1}^{T} \alpha_t h_t(x), \quad (5)$$

where the "T" represents the default value, the "$h_t(\ )$" is the weak classifier generated by the tth training round, and the "$\alpha_t$" is the accuracy corresponding to the weak classifier generated by the tth training round.

Based on the above, the method and the device for human action recognition identify gesture types drawn by the user's hand in the air through a method of learning to rank. In this way, identification rules for each of the gesture types do not need to be defined in advance. As a result, not only can gesture types to be identified be flexibly increased or decreased, accurate identification results can also be obtained.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A method for human action recognition, comprising:
receiving a plurality of training data, wherein the plurality of training data correspond to a plurality of gestures and a corresponding relationship between the plurality of training data and the plurality of gestures may be one-to-one, or many-to-one;
clustering the plurality of training data into at least one group according to a similarity between the plurality of training data;
capturing an image sequence of a human action, and obtaining a data representing the human action to be identified from the image sequence;
selecting a specific group having a highest similarity with the data to be identified from the at least one group;
obtaining a ranking result of all the training data within the specific group through a rank classifier and the data to be identified;
obtaining a first training data from the ranking result;
identifying the human action as the gesture represented by the first training data,
training the rank classifier through a method of learning to rank, wherein the rank classifier reflects a ranking relationship and a data distance of each pair-wise data in all of the training data within the specific group, and the step of training the rank classifier through the method of learning to rank comprises:
generating a weak classifier according to all of the training data within the specific group and a weight value of each of the pair-wise data in all of the training data within the specific group;
obtaining the ranking relationship of each of the pair-wise data through the weak classifier, wherein the ranking relationship comprises the pair-wise data is concordant in two ranking results of training or the pair-wise data is discordant in two ranking results of training;
calculating an accuracy of the weak classifier according to the ranking relationship and the data distance of each of the pair-wise data;
updating the weight value of each of the pair-wise data according to the accuracy and the ranking relationship and the data distance of each of the pair-wise data; and
repeating each of the steps until a convergence condition is met, and generating the rank classifier through each of the generated weak classifiers and the corresponding accuracy of each thereof, wherein the convergence condition comprises a total number of training rounds reaches a default value or the ranking relationship of each of the pair-wise data no longer changes.

2. The method of claim 1, wherein the gesture represented by each of the plurality of training data corresponds to a control instruction of an electronic system, and further comprising, after the step of identifying the human action as the gesture represented by the first training data:
    transmitting the control instruction corresponding to the gesture represented by the first training data to the electronic system such that the electronic system executes a function.

3. The method of claim 1, wherein the step of clustering the plurality of training data into the at least one group according to the similarity between the plurality of training data comprises:
    clustering the plurality of training data into the at least one group through a classifier method.

4. The method of claim 3, wherein the classifier method comprises k-nearest neighbor algorithm (KNN) or hierarchical clustering.

5. The method of claim 1, wherein the human action is a forelimb action and the gesture is a dynamic number gesture or a dynamic English alphabet gesture.

6. A system for human action recognition, comprising:
    a memory recording a plurality of instructions; and
    a processor coupled to the memory for accessing and executing the plurality of instructions recorded in the memory to execute the following steps:
        receiving a plurality of training data, wherein the plurality of training data correspond to a plurality of gestures and a corresponding relationship between the plurality of training data and the plurality of gestures may be one-to-one, or many-to-one;
        clustering the plurality of training data into at least one group according to a similarity between the plurality of training data;
        capturing an image sequence of a human action, and obtaining a data representing the human action to be identified from the image sequence;
        selecting a specific group having a highest similarity with the data to be identified from the at least one group;
        obtaining a ranking result of all the training data within the specific group through a rank classifier and the data to be identified;
        obtaining a first training data from the ranking result; and
        identifying the human action as the gesture represented by the first training data,
        training the rank classifier through a method of learning to rank, wherein the rank classifier reflects a ranking relationship and a data distance of each pair-wise data in all of the training data within the specific group, and the step of training the rank classifier through the method of learning to rank comprises:
            generating a weak classifier according to all of the training data within the specific group and a weight value of each of the pair-wise data in all of the training data within the specific group;
            obtaining the ranking relationship of each of the pair-wise data through the weak classifier, wherein the ranking relationship comprises the pair-wise data is concordant in two ranking results of training or the pair-wise data is discordant in two ranking results of training;
            calculating an accuracy of the weak classifier according to the ranking relationship and the data distance of each of the pair-wise data;
            updating the weight value of each of the pair-wise data according to the accuracy and the ranking relationship and the data distance of each of the pair-wise data; and
            repeating each of the steps until a convergence condition is met, and generating the rank classifier through each of the generated weak classifiers and the corresponding accuracy of each thereof, wherein the convergence condition comprises a total number of training rounds reaches a default value or the ranking relationship of each of the pair-wise data no longer changes.

7. The system for human action recognition of claim 6, wherein the gesture represented by each of the plurality of training data corresponds to a control instruction of an electronic system, and further comprising, after the step of identifying the human action as the gesture represented by the first training data:
    transmitting the control instruction corresponding to the gesture represented by the first training data to the electronic system such that the electronic system executes a function.

8. The system for human action recognition of claim 6, wherein the step of clustering the plurality of training data into the at least one group according to the similarity between the plurality of training data comprises:
    clustering the plurality of training data into the at least one group through a classifier method.

9. The system of claim 8, wherein the classifier method comprises k-nearest neighbor algorithm (KNN) or hierarchical clustering.

10. The system for human action recognition of claim 6, wherein the human action is a forelimb action.

11. The system for human action recognition of claim 6, wherein and the gesture is a dynamic number gesture or a dynamic English alphabet gesture.

* * * * *